United States Patent [19]

Knecht

[11] Patent Number: 4,693,516

[45] Date of Patent: Sep. 15, 1987

[54] HEADREST ASSEMBLY AND METHOD FOR MAKING SAME

[76] Inventor: Hillery G. Knecht, 1720 Tiverton, Bloomfield Hills, Mich. 48013

[21] Appl. No.: 896,430

[22] Filed: Aug. 14, 1986

[51] Int. Cl.⁴ ............................................. A47C 7/36
[52] U.S. Cl. ............................... 297/391; 297/DIG. 2
[58] Field of Search ................. 297/DIG. 2, 391, 410, 297/445

[56] References Cited

U.S. PATENT DOCUMENTS

| | | | |
|---|---|---|---|
| 3,084,980 | 4/1963 | Lawson | 297/DIG. 2 |
| 3,508,788 | 4/1970 | Barton et al. | 297/391 |
| 3,706,472 | 12/1972 | Mertens | 297/391 |
| 3,873,154 | 3/1975 | Baker | 297/445 |

FOREIGN PATENT DOCUMENTS

| | | | |
|---|---|---|---|
| 0092472 | 10/1983 | European Pat. Off. | 297/DIG. 2 |
| 2400612 | 7/1975 | Fed. Rep. of Germany | 297/391 |
| 2948537 | 6/1981 | Fed. Rep. of Germany | 297/391 |

Primary Examiner—Francis K. Zugel
Attorney, Agent, or Firm—Reising, Ethington, Barnard, Perry & Milton

[57] ABSTRACT

An automobile seat back headrest assembly and a method of fabricating same. The method comprises the steps of simultaneously molding a support (16, 116) and head (14, 117) to produce an integral and homogeneous frame member (12, 112). The head (14, 117) is covered with a known protective foam material (26). The assembly (10, 110) is characterized by the support (16, 116) and body (14, 117) being integral and homogeneous.

1 Claim, 6 Drawing Figures

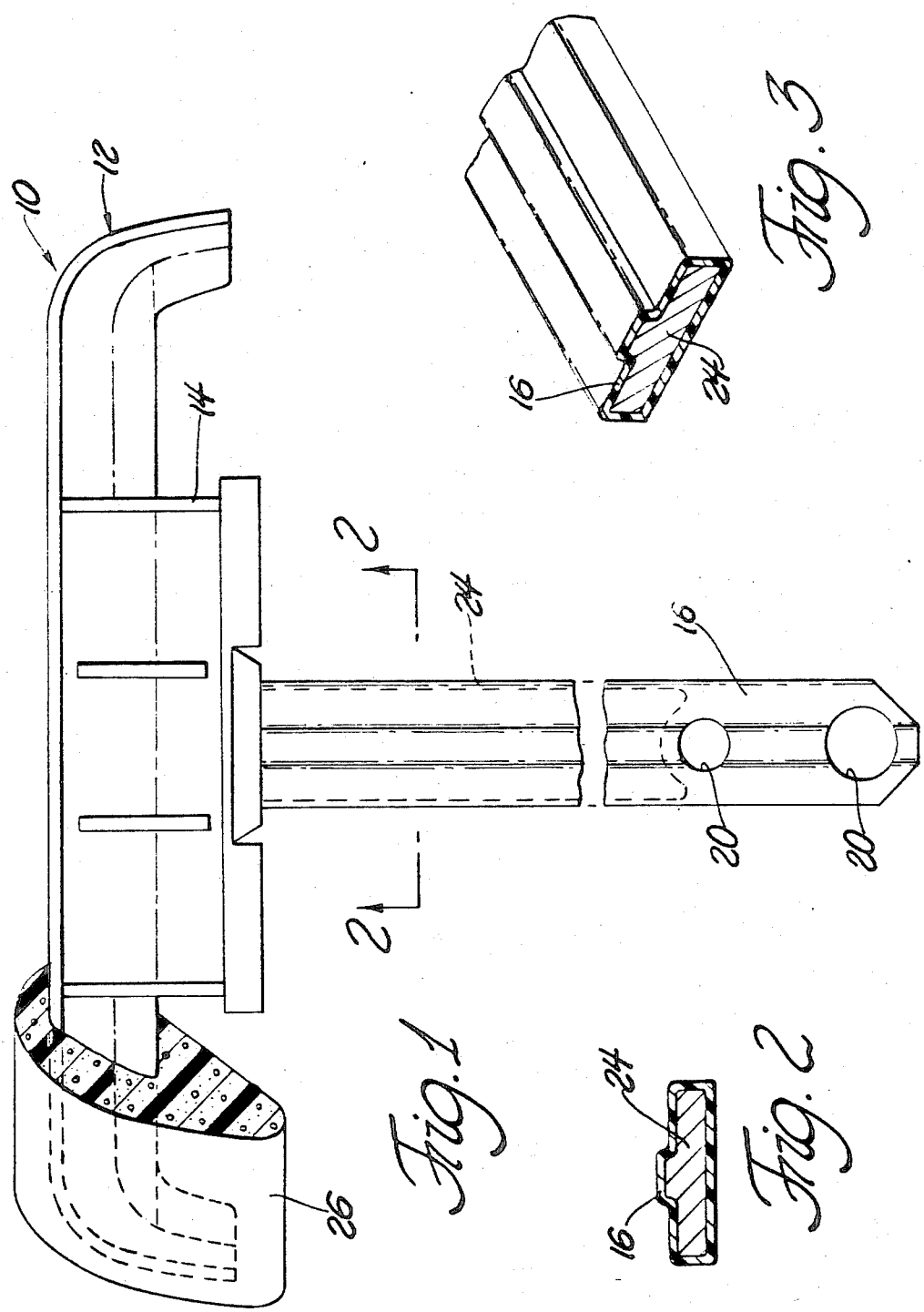

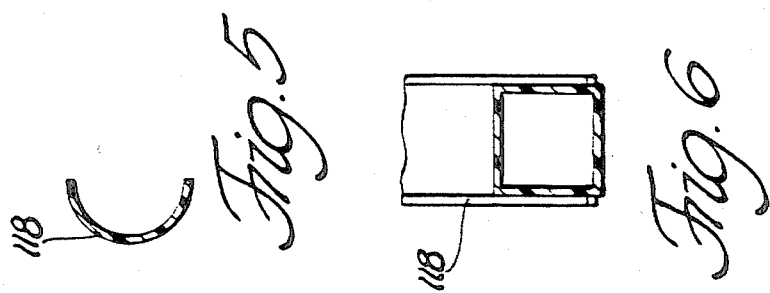
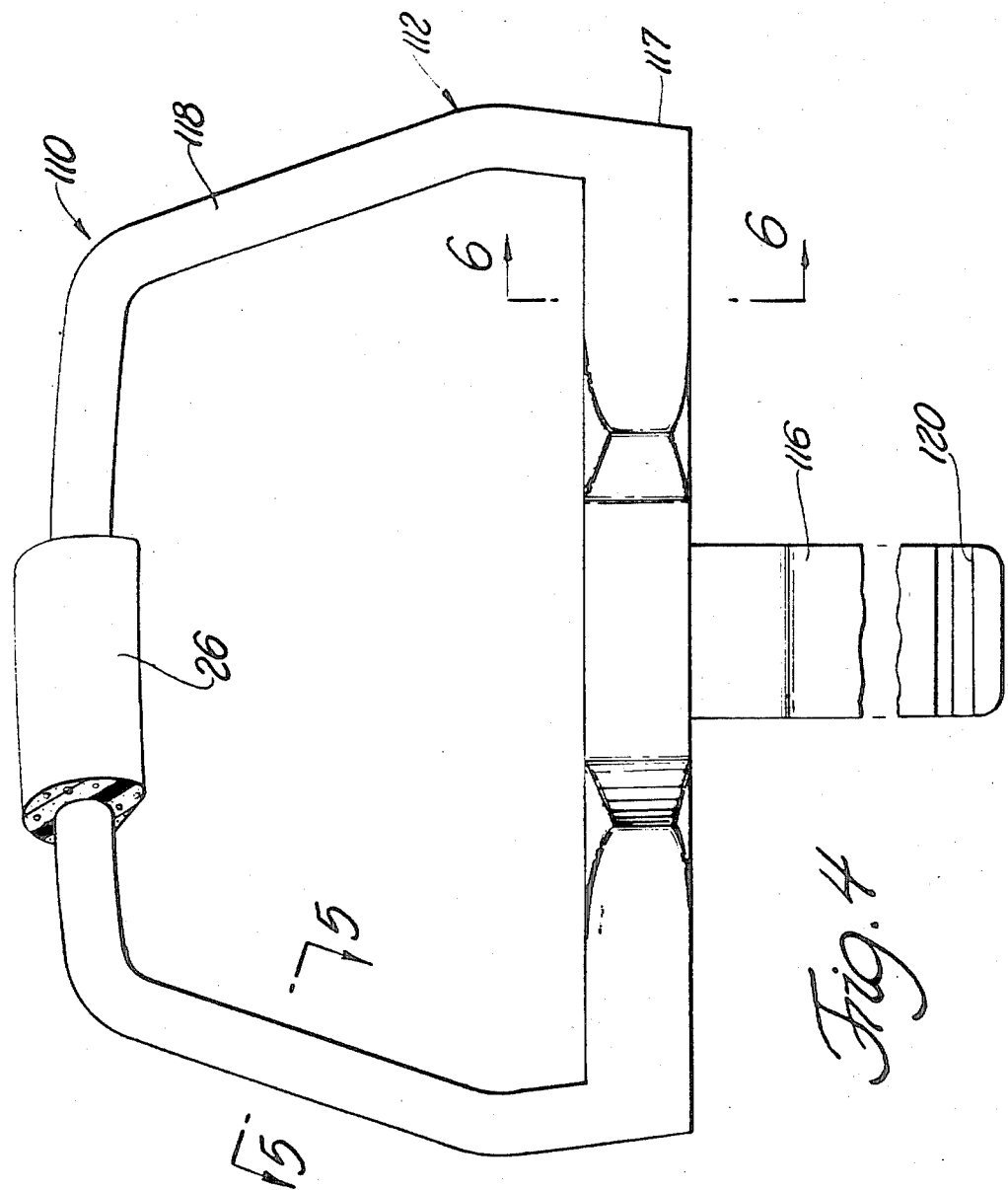

HEADREST ASSEMBLY AND METHOD FOR MAKING SAME

TECHNICAL FIELD

This invention relates to automotive seat headrests which support the head of a person from the back to prevent injuries in the invent of a collision.

BACKGROUND ART

Currently automobile headrest frames are made of metals, and are multi-part frames which are integrally connected. For example, a head portion and a support are stamped and then riveted and/or welded together. The support is drilled to provide a hole for fastening the headrest to the seat back. In addition, before the frame can be used, it must be deburred to remove sharp edges.

The U.S. Pat. No. 3,537,750 to Lohr issued July 3, 1968, discloses an integrally connected multi-part headrest assembly. The upper head portion comprises a plastic honeycomb structure. The support bars are made of steel tubing, and must be drilled and deburred, prior to connection with the upper head portion. The assembly includes plastic fastened about metal supports.

STATEMENT OF THE INVENTION AND ADVANTAGES

According to the present invention, there is provided a method for manufacturing an automobile headrest assembly entirely from organic polymeric material.

The method comprises the steps of molding a support and a head to form a continuous integral frame member, and covering the head with a protective material.

Accordingly, the assembly comprises a frame member including a head and a support being integral and homogeneous.

Accordingly, the present invention provides a one piece headrest frame which requires no machining or assembly after it has been molded into the desired shape.

FIGURES IN THE DRAWING

Other advantages of the present invention will be readily appreciated as the same becomes better understood by reference to the following detailed description when considered in connection with the accompanying drawings wherein:

FIG. 1 is a front view of a headrest frame made in accordance with the present invention;

FIG. 2 is a cross-sectional view taken substantially along lines 2—2 of FIG. 1;

FIG. 3 is an isometric view of a portion of the support;

FIG. 4 is a front view of an alternate embodiment made in accordance with the present invention;

FIG. 5 is a cross-sectional view taken substantially along lines 5—5 of FIG. 4; and FIG. 6 is a cross-sectional view taken substantially along lines 6—6 of FIG. 4.

DETAILED DESCRIPTION OF THE DRAWINGS

A headrest frame assembly according to the present invention is generally shown at 10 and 110 in the Figures.

The assembly comprises a frame member generally indicated at 12, 112 including a head 14, 117 and a support 16, 116. The headrest frame assembly 10 is characterized by the head 14, 117 and support 16, 116 being integral and homogeneous.

More specifically, the head 14, 117 and support 16, 116 are continuous, i.e., formed as a single homogenous headrest frame member 12. Because the frame member 12, 112 is made as one piece, the prior steps of attaching the support 16, 116 to the body 14, 117 member as eliminated.

The headrest frame member 12, 112 is preferably made of an organic polymeric material which can easily be molded into any desired shape. The organic polymeric material is lightweight and provides the necessary strength to protect a human in the event of a collision. The preferable organic polymeric material to be used is polycarbonate.

In the embodiment shown in FIG. 1, the head 14 extends transversely across one end of the support 16 to define a T shape. In the alternative of FIG. 4, the head may includes a lower head portion 117 which extends transversely across one end of the support to define a generally T shaped member and having a generally C shaped upper head portion 118 thereon. The upper body portion 188 is integral and continuous with the lower head portion 117.

The support 16, 116 contains adjustment means for connecting the assembly 10, 110 to an automobile seat (not shown) and for adjusting the height of the assembly 10, 110 relative to the seat. The adjustment means are molded into the support 16, 116. The adjustment means may comprise holes 20 through the support as shown in FIG. 1 or a groove 120 as shown in FIG. 4.

The support 16, 116 may include a preformed metal support bar 24 disposed within the support 16, 116. The metal support bar 24 is shorter in length then the support 16, 116 i.e., the metal support bar 24 is not coextensive with the support 16, 116. The metal support bar 24 is in the cross-sectional shape of the support 16, 116 but is of a smaller dimension and is completely encapsulated and embedded within the support 16, 116. The metal support bar 24 adds strength to the support 16, 116 so that the support 16, 116 does not bend in the event of a collision. Since the metal support bar 24 is not coextensive with the support 16, 116 the need to drill holes 20 for the adjustment means through the metal support bar 24 is eliminated. The metal support bar 24 is preferably made of lightweight metal such as aluminum.

The head 14, 117 of the continuous, integral headrest frame assembly 10, 110 is covered with a protective covering 26. The covering 26 is to provide padding for the automobile passenger so that the headrest assembly 10, 110 is comfortable. Also, the covering 26 prevents one's head from directly stricking the head 14, 117 in the event of a collision. The protective covering 26 preferably comprises foam disposed over the head 14, 117 of the frame member 12, 112. The support 16, 116 is not covered because it is connected to the back of the seat (not shown) and must not be covered so the height of the headrest assembly 10, 110 relative to the seat can be adjusted.

The method of manufacturing the automobile headrest assembly 10, 110 comprises the steps of molding a support 16, 116 and a head 14, 117 to form a continuous integral frame member 12, 112 and covering the head 14, 117 of the frame member 12, 112 with a protective material 26. The support 16, 116 and the head 14, 117 are molded simultaneously to form an integral, continuous headrest frame member 12, 112.

Prior to molding the frame member 12, 112 a preformed metal support bar 24 may be inserted into the mold to provide strength to the support 16, 116. The support 16, 116 is then molded about the metal support bar 24 so as to completely encapsulate and embed the preformed metal support bar 24.

The protective material 26 used to cover the body is preferably rubber foam of the type well known in the art. The foam provides a soft layer between one's head and the head 14, 117 as the foam covers only the hed 14, 117. The support 16, 116 is not covered by foam, because the support 16, 116 is inserted into metal guides in the seat back to allow the height of the headrest assembly 10, 110 to be adjusted relative to the seat.

Therefore, the present invention provides a method for making a continuous, homogeneous and integral headrest frame member, which eliminates the steps of fabrication and assembly of a stamped metal multi-part frame member, thereby substantially reducing labor costs. Also, the plastic material used is lightweight.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A protective headrest (10, 110) for mounting on the seat back of an automotive vehicle comprising; a frame member (12, 112) including a head (14, 117) and a support (16, 116), said head (14, 117) and said support (16, 116) being integral and homogeneous and made of an organic polymeric material to define said frame member (12, 112), said head extending transversely across one end of said support (16, 116) to define a T-shape, said support (16, 116) having a preformed metal support bar (24) completely embedded therein and extending from said head (14, 117) a shorter distance than said support (16, 116), said support (16, 116) and said metal support bar (24) having a substantially rectangular cross-section, and a protective covering (26) comprising foam disposed over said head (14, 117).